Jan. 30, 1923. Re. 15,533

J. B. ATKINS.
RIM STRUCTURE.
ORIGINAL FILED SEPT. 17, 1918. 2 SHEETS-SHEET 1

Inventor
James B. Atkins
By R. S. Trojner
Attorney

Jan. 30, 1923
Re. 15,533
J. B. ATKINS.
RIM STRUCTURE.
ORIGINAL FILED SEPT. 17, 1918.
2 SHEETS-SHEET 2
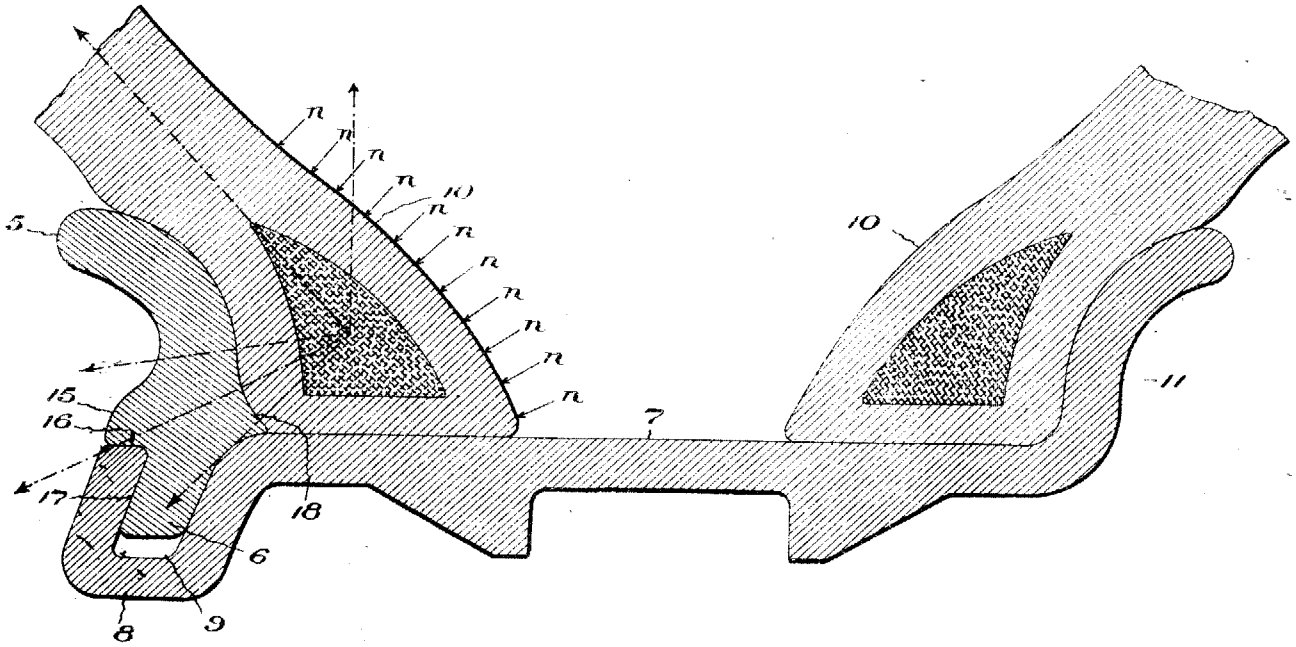
Inventor
James B. Atkins
By R. S. Troyer
Atty.

Reissued Jan. 30, 1923.

Re. 15,533

UNITED STATES PATENT OFFICE.

JAMES BYRON ATKINS, OF AKRON, OHIO, ASSIGNOR TO THE GOODYEAR TIRE & RUBBER COMPANY, OF AKRON, OHIO, A CORPORATION OF OHIO.

RIM STRUCTURE.

Original No. 1,278,822, dated September 17, 1918, Serial No. 176,092, filed June 21, 1917. Application for reissue filed September 16, 1920. Serial No. 410,778.

*To all whom it may concern:*

Be it known that I, JAMES B. ATKINS, a citizen of the United States, residing at Akron, in the county of Summit and State of Ohio, have invented new and useful improvements in Rim Structures, of which the following is a specification.

My present invention relates to rims for detachably mounting vehicle tires upon their wheels. Rims of this type usually include a base member secured to the wheel felly and formed up along one edge to provide an integral, annular, tire-bead-engaging flange which will prevent lateral displacement of the vehicle tire at that side of the rim. The opposite side of the rim is formed to produce an annular gutter in which may be detachably seated a split annular flange or bead engaging ring having a cross-sectional shape similar to the integral rim flange, although it is removable in order to permit the dismounting of the tire from its rim.

One of the main objections to this type of vehicle wheel rim arises from the fact that some means must be provided to connect extremities of the split locking ring, as otherwise this ring would work loose from its ring channel and cause an unlooked for displacement of the tire from its rim. This is due to the fact that the side rings of the prevailing types of separable rim-structures are customarily of the "floating" type, that is, they fit in their rim channels relatively loosely in order to facilitate their removal when dismounting a tire from the rim.

It is one of the principal objects of this invention, accordingly, to provide a rim of the sectional type in which the necessity of providing fastening means for the adjacent extremities of the split locking ring is obviated. This object is gained by forming the locking ring channel, or gutter, obliquely to the base portion of the rim and by constructing the locking ring with inherent or inbuilt contractile resiliency and with an oblique anchoring edge which is adapted to seat within the locking channel and to maintain the ring therein against all normal tendency to become displaced.

It is a further object of the present invention to provide a locking ring for a sectional tire rim which is of such construction and which is so seated upon its rim that a unique bearing is provided for the ring, and one which prevents any twist or lateral displacement of the side ring with respect to the rim, by utilizing the force of tire expansion to all the more firmly seat the ring in its channel.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 4 is a diagrammatic view in section (the same as Fig. 2 but enlarged) showing the pressure-moments and lines of action of the resultant of the forces to which the flange ring is subjected.

Figure 1:
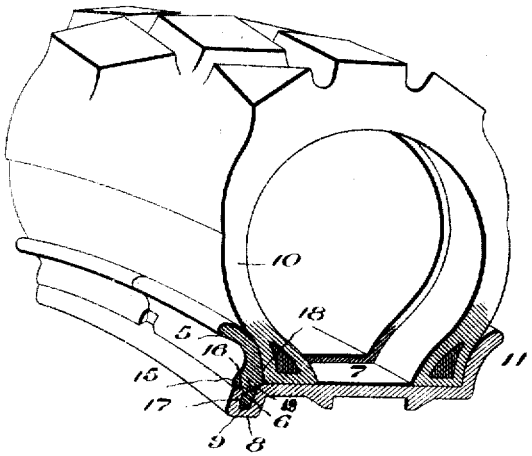
Figure 1 is a fragmentary perspective view of a tire mounted upon the sectional rim of this invention.

It should be understood that one fault of rim construction which must be rigorously guarded against by the manufacturer is the tendency of a flange ring to spread away from the fixed rim flange opposite, when the tire is fully inflated or over-inflated. The widening of the tire base by even the minute spreading caused by a partial twisting of the detachable flange ring in the rim channel is alleged by tire users to lead to premature tire destruction. The limit of spread of the detachable ring from the opposite rim flange or fixed ring is set at .07 of an inch by manufacturers of standard rims, the ring not being permitted to exceed this limit of spread during the inflation of the tire from twenty five pounds air pressure up to one hundred and sixty pounds of pressure.

In the past, makers of sectional rims, in producing a spreadless rim, have depended upon a "straight" rim channel, i. e., one at right angles to the base of the rim, in which is removably seated a floating split ring having a bearing in the bottom of the rim channel or gutter, this ring having its adjacent extremities secured to the rim by some type of detachable fastening means, holding the flange ring immovable in its channel when correctly placed.

This practice is objectionable in so far as regards the fastening means for the extremity of the split ring, as these fasteners are prone to become rusted to the ring in such fashion as to be non-removable without the aid of heavy tools, which, in turn, are liable to injure the fastener to such an extent that it becomes unserviceable for continued use. Even when the removable flange ring is provided with an inbuilt contractile resiliency, (which takes it out of the floating ring class), there is not a sufficient guard against possible twisting to safely rest this ring in the channel unaccompanied by some means securing the split ends of the ring to the rim.

According to this invention, however, it is possible to eliminate all forms and types of the heretofore indispensable split ring fasteners by the simple, yet extremely efficient expedient of inclining laterally inwardly the channel 9 which is provided in the inwardly extending integral annular offset 8 on the rim base 7, and similarly inclining the annular flange stem 6 which seats the flange ring into such channel, while at the same time building such contractile springing force into the flange ring to cause it to hug the sides of the rim channel or gutter closely.

One serious objection, however, which can be advanced against the structure which was previously proposed in this art arises from the fact that the detachable flange-ring has by actual test and experiment, been found to spread farther from the fixed rim flange 11 than is altogether desirable, that is, beyond the standard limit of .07 of an inch.

Figure 2:
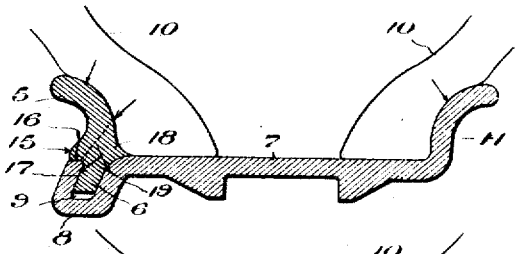
Fig. 2 is a cross-sectional view of the rim of Fig. 1 as constructed to provide the double bearing for the detachable flange ring.

For this reason the flange ring 5 has been improved and reconstructed by this invention in the manner illustrated more particularly in Figs. 1, 2 and 4 in such fashion as to give it a bearing upon both sides of the outer channel edge and also interiorly of the channel at the same time, the first bearing being located in prolongation of the resultant of the lines of force caused to be exerted on the side ring by under-inflation or super-inflation of a tire 10 mounted on the rim.

The flange-ring 5 is enlarged upon its outward side by the addition of an integral annular shoulder 15 which overlaps the outer channel rim in the snug fashion shown, affording the ring a pair of intersecting and annular bearing faces 16 and 17 adjacent to the inner corner of the channel rim which together operate as a double bearing to prevent any torsional movement of the flange-ring 5. As shown in Fig. 2 and more particularly by the dotted-line and arrow indications in Fig. 4, when the line of action of the resultant of the forces acting upon the beads of the tire passes within the boundaries of the bearing faces 16 and 17, all tendency on the part of the flange-ring 5 to rotate about any point within those boundaries is eliminated, as well as any tendency to cause a leverage action.

The opposite side of the ring 5 is enlarged to provide an annular shoulder 18 which affords that side of the ring an annular bearing path 19 upon the inner surface of the channel, and which prevents the ring 5 from being displaced in the event of under-inflation.

The split flange-ring 5 has such contractile resiliency that it can be sprung into position in the inclined channel 9, and when the tire is in place upon the rim and is inflated, the flange-ring 5 keeps its place in the inclined channel 9 regardless of the fact that no fastening means are provided to secure the ends of the flange-ring 5 to the rim.

Figure 3:
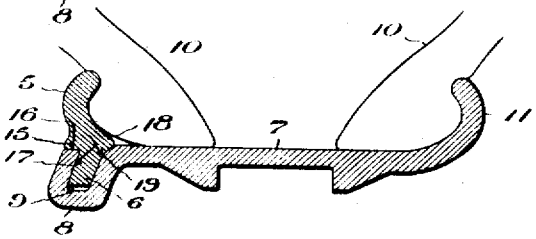
Fig. 3 is a modification of the rim to suit a type of tire differing from that of Figs. 1 and 2.

Actual tests taken upon the improved rim structure shown in Figs. 1, 2 and 4 and the modification shown in Fig. 3 prove that the flange-ring 5 will stay in place without fastening means and that no normal inflation or overinflation of the tire can possibly twist said flange-ring upon its double bearing in the rim gutter 9 to such an extent as to spread said detachable flange-ring from the fixed rim flange 11 to any perceptible extent.

Fig. 3 discloses a rim constructed on principles identical with those set forth in the foregoing but adapted for clincher tires instead of the "straight-side" or "no-hook" type of tires chosen for illustration in the remaining figures. The side ring used with the rim of Fig. 3 has the novel and successful double bearing which this invention has found so necessary and advantageous.

It is known to the present inventor that removable split side rings for sectional rims have been previously offered to the art in which the ring was formed with laterally swelling shoulders overlapping the adjacent sides of the rim channel in which the ring was mounted. It is here desired to point out, however, that these prior detachable rim side rings, although somewhat similar in shape to that here proposed, were not offered to accomplish the same result as the ring herein delineated, nor are they capable of accomplishing such results unless they be modified in accordance with the disclosures herein. The overlapping flanges of previous side rings would be quite helpless to prevent a twisting of the ring in its rim channel, were it not for the firm fastening of the extremities of the split ring to the rim base.

What I claim is:

1. A rim-structure including an annular base-member formed with an integral outstanding annular flange and with an integral depending portion provided with a relatively deep ring-seating channel and formed with unaligned shoulders spaced apart by the channel, one of the shoulders being formed by an outstanding section of the channeled seating portion, and a flange-ring separably associated with the channel and formed at one side with an elongated wall-engaging bearing surface and with an angular overhanging bearing surface, the elongated surface contacting with one wall of the channel and the overhanging surface engaging with the shoulder on an outstanding section of the channeled seating portion, the ring being formed on its opposite side with a curved bearing face to engage the correspondingly-formed shoulder on the depending seating portion, whereby twisting movement of the flange-ring in its seat is prevented.

2. A rim-structure comprising an annular base member having along one side thereof an outwardly projecting integral annular flange and having along its other side an inwardly projecting integral annular offset provided with an endless channel formed oblique to the outer face of said base member, and a one-piece split flange-ring having an inherent contractile resilience so that it can be sprung into place into said channel and maintain itself against dislodgment from its seat in said channel, said flange-ring having on opposite sides thereof annular shoulders which provide a two-point bearing on the channel sides for maintaining said flange-ring against twisting movement.

3. A vehicle rim-structure comprising an annular base-member provided at one edge thereof with a straight-side-tire retaining flange, and an annular channel formed by the other edge portion of the base-member, the outer wall of the channel being inwardly inclined relatively to the tire-engaging surface of the rim and laterally offset therefrom, and a one-piece split ring having inherent contractile resiliency and embodying an oblique annular portion adapted to enter the channel, an annular straight-side-tire retaining flange, and an annular shoulder intermediate the oblique portion and the flange and adapted to seat on the outstanding wall of the channel, said oblique portion being spaced from the bottom of the channel in order to insure seating of the annular shoulder of the ring on the peripheral surface of the outstanding channel wall.

4. A vehicle rim-structure for tires comprising an annular base-member provided at one edge with an annular channel, the inner face of the outer wall of the channel being inwardly inclined relative to the tire-engaging surface of the base-member, and a one-piece split ring having inherent contractile resiliency and embodying an annular channel-entering portion, an annular tire-retaining flange, and an annular outstanding portion intermediate the flange and channel-entering portion and presenting a seating instrumentality distinct from the flange and adapted to seat on the outstanding wall of the channel, the channel-entering portion being spaced from the bottom of the channel to insure seating of the outstanding portion of the ring on the outstanding channel wall.

5. A vehicle rim-structure for tires comprising an annular base-member provided at one edge with a tire-retaining flange and an annular channel formed by the other edge-portion of the base-member, the outer wall of the channel being inwardly inclined relative to the tire-engaging surface of the base-member and laterally and radially offset therefrom, and a one-piece split ring having inherent contractile resiliency and embodying an annular oblique channel-entering portion, an annular tire-retaining flange, and an annular portion intermediate the flange and channel-entering portion and presenting a seating instrumentality adapted to seat on the outstanding wall of the channel, the channel-entering portion being spaced from the bottom of the channel to insure seating of the outstanding portion of the ring on the outstanding channel wall.

6. A vehicle rim structure for tires having straight-side bead portions comprising, a rim base having an annular channel formed in one of its marginal portions, the outer wall of said channel being inwardly inclined relative to the tire-engaging surface of the rim base and laterally and radially offset therefrom, and a one-piece split self-retaining flange ring having inherent contractile resiliency and embodying a tire-engaging flange, an annular shoulder adapted to seat on the peripheral face of the outer wall of the channel beyond the plane of the outer edge of the base of the tire, and an oblique annular portion adapted to enter the channel to engage the inner face of the outer wall of the channel, said oblique portion being spaced from the bottom of the channel to insure the seating of the annular shoulder of the ring on the peripheral face of the outer wall of the channel.

7. A vehicle rim-structure for tires comprising an annular base-member provided at one edge thereof with a straight-side-tire retaining flange, and an annular channel formed by the other edge portion of the base-member, the outer wall of the channel being inwardly inclined relative to the tire-engaging surface of the rim and laterally offset therefrom, and a one-piece split ring having inherent contractile resiliency and embodying an oblique annular portion adapted to enter the channel, an annular tire-retaining flange formed with an annular portion adapted to seat on the outstanding wall of the channel, and an annular inwardly extending twist-preventing portion, said oblique portion being spaced from the bottom of the channel in order to insure seating of the annular shoulder of the ring on the peripheral surface of the outstanding channel wall.

8. A vehicle rim-structure for tires comprising an annular base-member provided at one edge with an annular channel, the inner face of the wall of which is inwardly inclined relative to the tire-engaging surface of the base-member, and a one-piece split ring having inherent contractile resiliency and embodying an annular tire-retaining flange, an annular channel-entering portion, and an annular outstanding portion intermediate the flange and channel entering portion, said two portions presenting angularly-disposed engaging surfaces distinct from the flange, the one seating on the outstanding wall of the channel and the other bearing against said inwardly inclined face thereof, the channel-entering portion being spaced from the bottom of the channel to insure seating of the outstanding portion of the ring on the outstanding channel wall.

9. A vehicle rim structure for tires having straight-side bead portions comprising, a rim base having an annular groove formed in one of its marginal portions, said groove having a radially offset outer wall, and a removable single-piece split ring having a tire retaining flange, a part of said ring being adapted to seat on the peripheral face of said outer wall, the ring having a groove entering portion adapted to engage the inner face of said outer wall, said groove, entering portion being spaced from the bottom of said groove, and a portion of said ring being adapted to seat on the inner side of said channel.

In witness whereof, I hereunto sign my name in the presence of two subscribing witnesses.

JAMES BYRON ATKINS.

Witnesses:
H. S. Kreighbaum,
Wm. C. McCoy.

Certificate of Correction.

It is hereby certified that in Reissue Letters Patent No. 15,533, granted January 30, 1923, upon the application of James Byron Atkins, of Akron, Ohio, for an improvement in "Rim Structures," an error appears requiring correction as follows: In the heading to the drawings, line 3, date of filing, for "Sept. 17, 1918" read *June 21, 1917*, and that the said Letters Patent should be read with this correction therein that the same may conform to the record of the case in the Patent Office.

Signed and sealed this 5th day of August, A. D. 1924.

[SEAL.]

WM. A. KINNAN,
*Acting Commissioner of Patents.*